(12) United States Patent
Masaki et al.

(10) Patent No.: US 9,134,168 B2
(45) Date of Patent: Sep. 15, 2015

(54) VIBRATION SENSOR AND EXTERNAL DETECTION DEVICE

(75) Inventors: Tatsuakira Masaki, Nara (JP); Toru Yokoyama, Kyoto (JP); Keiki Matsuura, Nara (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 14/362,230

(22) PCT Filed: Aug. 16, 2012

(86) PCT No.: PCT/JP2012/070829
§ 371 (c)(1),
(2), (4) Date: Jul. 1, 2014

(87) PCT Pub. No.: WO2013/105298
PCT Pub. Date: Jul. 18, 2013

(65) Prior Publication Data
US 2014/0327337 A1    Nov. 6, 2014

(30) Foreign Application Priority Data

Jan. 10, 2012 (JP) ................. 2012-002545

(51) Int. Cl.
*H02N 1/00* (2006.01)
*G01H 11/06* (2006.01)
*H02N 1/08* (2006.01)

(52) U.S. Cl.
CPC .............. *G01H 11/06* (2013.01); *H02N 1/00* (2013.01); *H02N 1/08* (2013.01)

(58) Field of Classification Search
CPC .......... H02N 1/08; H02N 1/006; H02N 1/00; H02N 1/002; H02N 1/04; G03B 3/10; G03B 13/34

USPC ................................... 310/309, 300
See application file for complete search history.

(56) References Cited

U.S. PATENT DOCUMENTS

| | | | |
|---|---|---|---|
| 8,102,097 B2 * | 1/2012 | Naruse et al. | 310/309 |
| 8,384,267 B2 * | 2/2013 | Naruse et al. | 310/309 |
| 8,564,169 B2 * | 10/2013 | Sano | 310/309 |
| 8,564,170 B2 * | 10/2013 | Takeuchi et al. | 310/309 |
| 8,686,613 B2 * | 4/2014 | Miyata | 310/309 |
| 2008/0122313 A1 * | 5/2008 | Mabuchi et al. | 310/309 |
| 2008/0296984 A1 * | 12/2008 | Honma et al. | 310/17 |
| 2013/0076275 A1 * | 3/2013 | Cohen et al. | 318/116 |
| 2013/0241346 A1 * | 9/2013 | Boisseau et al. | 310/300 |

FOREIGN PATENT DOCUMENTS

JP    2009-284240 A    12/2009

OTHER PUBLICATIONS

International Search Report for corresponding International Application No. PCT/JP2012/070829, mailed Oct. 30, 2012 (1 page).

* cited by examiner

*Primary Examiner* — Joshua Benitez-Rosario
*Assistant Examiner* — Leda Pham
(74) *Attorney, Agent, or Firm* — Osha Liang LLP

(57) ABSTRACT

A vibration sensor has a first substrate, a second substrate relatively movable by an external vibration while opposed to the first substrate, an electret group having a plurality of electrets that are arrayed in a relative movement direction on a side of one of surfaces of the first substrate, and an electrode group having a plurality of electrodes that are arrayed in the relative movement direction on a side of a surface of the second substrate. The surface of the second substrate is opposed to the electret group. A positional relationship between the electret group and the electrode group changes with a relative change in position of the first and second substrates by the external vibration to output an external vibration detection signal.

9 Claims, 8 Drawing Sheets

Prior Art

VIBRATION SENSOR AND EXTERNAL DETECTION DEVICE

BACKGROUND

1. Technical Field

The present invention relates to a vibration sensor that detects an external vibration and a detection device that detects an environmental parameter including the external vibration.

2. Related Art

Nowadays, ever-present environmental energy independent of fossil fuel attracts attention for an energy-saving tendency. The energy generated from sunlight or wind power is widely known as the environmental energy, and ever-present vibration energy can also be cited as the environmental energy having an energy density that is not inferior to the energy generated from the sunlight or the wind power.

A vibration power-generating device that generates the power using the vibration energy has been developed, and an electret that can semipermanently retain a charge is widely used in the power-generating device (for example, see Patent Document 1). In the vibration power-generating technology, a movement direction of a movable substrate that reciprocates to generate the power is set to at least two directions different from each other in the power-generating device in which the electret is used. Therefore, the external vibration is efficiently collected in the power-generating device, and the power can be generated by the vibration.

PATENT DOCUMENT

Patent Document 1: Japanese Unexamined Patent Publication No. 2009-284240

SUMMARY

As illustrated in FIG. 7, generally the conventional vibration power-generating device in which the electret is used includes a pair of substrates 21 and 25 that are configured to be relatively movable while opposed to each other. Electret 22 and guard electrode 23 are arranged in an interdigital manner in one of substrates 21 and 25, and a pair of electrodes 26 and 27 is arranged in the other of substrates 21 and 25. When the external vibration is provided to the vibration power-generating device, electret 22 moves relative to the pair of electrodes 26 and 27, and electret 22 traverses the plural pairs of electrodes 26 and 27. Therefore, an output in which a ripple voltage corresponding to the number of traversed electrodes is superimposed on a waveform of a power generation voltage corresponding to a period of the external vibration is obtained after rectifier 28 as illustrated in FIGS. 8A and 8B. The conventional vibration power-generating device in which the electret is used is developed as described above.

At this point, an output voltage of the vibration power-generating device is not only the power generation output but also a vibration detection signal including vibration information on the external vibration. As described above, the voltage in which the ripple voltage is superimposed on the power generation voltage corresponding to the period of the external vibration is output in the vibration power-generating device in which the electret is used. A degree of superimposition of the ripple voltage fluctuates depending on magnitude of the relative movement of the electret and the interdigital electrode by the external vibration. For this reason, a status of the external vibration cannot immediately be understood from the direct power generation output voltage on which the ripple voltage is superimposed, but it is necessary to perform various pieces of electric processing such as frequency detection of the ripple voltage and removal of the ripple voltage from the power generation voltage. There is the need for a device that performs processing with respect to the external vibration or the power that is used to drive the device. Therefore, it is hard to say that the vibration power-generating device is conveniently used as vibration detection device.

One or more embodiments of the present invention provides a highly convenient vibration sensor that detects the external vibration using the electret.

According to one or more embodiments of the present invention, in a vibration sensor in which the electret is used, a plurality of configurations that generate the electric signals in response to the external vibration are provided. A predetermined phase difference is included between the electric signals generated by the configurations, and an external vibration detection signal is formed by superimposing the electric signals including the predetermined phase difference on each other. An influence of the ripple voltage that is generated when the electret traverses the plurality of electrodes can be reduced by superimposing the electric signals including the predetermined phase difference on each other, and therefore the convenience of the vibration sensor can be enhanced.

Particularly, a vibration sensor according to one or more embodiments of the present invention includes: first and second substrates configured to be relatively movable by an external vibration while opposed to each other; an electret group including a plurality of electrets that are arrayed in a relative movement direction on a side of one of surfaces of the first substrate; and an electrode group including a plurality of electrodes that are arrayed in the relative movement direction on a side of a surface of the second substrate, the surface of the second substrate being opposed to the electret group. In the vibration sensor, a positional relationship between the electret group and the electrode group changes with a relative change in position of the first and second substrates by the external vibration to output an external vibration detection signal, the electrode group is divided into a predetermined number of phases of at least two, a small electrode group configured to be able to generate an electric signal according to the external vibration in each phase, in one of the electrode group and the electret group, and a phase difference generation gap that generates a predetermined phase difference between electric signals generated by the plurality of small electrode groups is provided according to the predetermined number of phases between the electrodes adjacent to each other included in the electrode group or electrets adjacent to each other included in the electret group. As a result of the relative change in position of the first and second substrates by the external vibration, a signal formed by superimposing the electric signals generated by the plurality of small electrode groups on each other is output as the external vibration detection signal.

In the vibration sensor according to one or more embodiments of the present invention, a fluctuation in charge capacity corresponding to the external vibration between the electrode group and electret group that are provided in the two relatively movable substrates is output as the electric signal from the electrode group using a characteristic of the electret that can semipermanently retain a charge. At this point, in the vibration sensor, the electrode group is divided into the predetermined number of phases of at least two to form the small electrode groups, and the electric signals are generated by the small electrode groups of the predetermined number of phases according to the external vibration using the characteristic of the electret. The predetermined number of phases in one or more embodiments of the present invention may be any number that practically enhances accuracy of the external vibration detection signal obtained as a result of the superimposition of the electric signals described later. In principle, the bigger the predetermined number of phases, the better. The predetermined number of phases ranges properly from 3 to 6 from the viewpoint of practical design for the vibration sensor, for example, from the viewpoint of a dimension and arrangement of a pad that takes out the signal from the electrode and a power loss in a rectifier that rectifies the taken-out signal. In one or more embodiments of the present invention, the predetermined number of phases of at least 7 may be used as long as the vibration sensor does not lose the function.

At this point, in the vibration sensor, the phase difference generation gap is provided in one of the electrode group and the electret group. In the case that the phase difference generation gap is provided in the electrode group, the phase difference generation gap is the electrode gap provided between one of the electrodes included in the electrode group and the electrode adjacent to the one of the electrode, and the phase difference generation gap enables the electric signals to have the predetermined phase difference therebetween such that the electric signals generated by the small electrode groups in response to the external vibration are not matched with each other. That is, in the configuration that the electret group sequentially traverses the plurality of electrodes included in the electrode group by the relative movement of the first and second substrates and the movement of the electret group is reflected in the electric signal generated by the electrode group, the phase difference generation gap is provided as the electrode gap between the electrodes in the electrode group to generate a time lag (that is, phase difference) between the electric signals generated by the small electrode groups. The same holds true for the case that the phase difference generation gap is provided as the gap between the electrets included in the electret group. That is, between the relatively movable electrode group and electret group, it is necessary to arrange the phase difference generation gap in one of the electrode group and the electret group in order to generate the phase difference between the electric signals generated by the small electrode groups.

The electric signals are generated from the external vibration including the appropriate phase difference in the small electrode groups, the phase difference provided by the existence of the phase difference generation gap. In the vibration sensor according to one or more embodiments of the present invention, the electric signals are output as the external vibration detection signal while superimposed on each other. In the electric signal generated by each small electrode group, the ripple voltage signal, which is generated when the electret included in the electret group traverses the electrode included in the electrode group, is superimposed based on a frequency along with the external vibration frequency. However, because the electric signals generated by the small electrode groups include the phase difference caused by the phase difference generation gap, even when the electric signals are superimposed on each other, the superimposition of the ripple voltage signals is avoided due to the existence of the phase difference, or the ripple voltage signals are partially superimposed. As a result, a degree of influence of the ripple voltage signal on a fundamental signal along with the external vibration can be relaxed. Accordingly, as described above, the signal formed by the superimposition relaxes the influence of the ripple voltage that cannot be solved by the conventional technology in the detection of the external vibration using the electret. Therefore, by using the signal as the external vibration detection signal, the convenience of the vibration sensor can be improved.

As described above, the predetermined phase difference included in the electric signals generated by the small electrode group is a necessary factor that relaxes the degree of influence of the ripple voltage signal on the fundamental signal along with the external vibration, and the phase difference generation gap may properly be set in the practical vibration sensor such that the relaxation effect becomes prominent based on specific structures or dimensions of the electrode and electret. A specific example of the configuration of the phase difference generation gap generating the predetermined phase difference is cited. For example, in the vibration sensor, one of the electret group and the electrode group is set to a uniform arrangement group in which gaps between the electrodes included in the electrode group or gaps between the electrets included in the electret group are kept constant, and another one of the electret group and the electrode group is set to a non-uniform arrangement group in which the electrets arranged in the electret group or the electrodes arranged in the electrode group include the phase difference generation gap. In this case, the gaps between the electrodes adjacent to each other or the gaps between the electrets adjacent to each other in the uniform arrangement group may be set substantially equal to the gaps between the electrodes or the gaps between the electrets adjacent to each other except the phase difference generation gap in the non-uniform arrangement group. In the vibration sensor having the configuration, the phase difference generation gap exists in the gaps between the electrets included in the electret group and the gaps between the electrodes included in the electrode group. Therefore, the predetermined phase difference can be included in the electric signals corresponding to the predetermined number of phases generated by the small electrode groups in order to relax the influence of the ripple voltage signal, and the external vibration detection signal can be formed by superimposing the electric signals.

In the vibration sensor, a phase difference generation gap $A1$ may be expressed by the following equation: $A1 = A \pm (W+A)/N$, where $W$ is a width of the electrode or the electret, $A$ is the gap between the electrodes or the gap between the electrets adjacent to each other except the phase difference generation gap in the non-uniform arrangement group, and $N$ is the predetermined number of phases. In this case, the predetermined phase difference can averagely be included in the electric signals generated by the small electrode groups, and the external vibration detection signal formed by the superimposition is hardly influenced by the electric signal generated by the specific small electrode group.

The arrangement of the phase difference generation gap in the vibration sensor will be described in detail. As to an example of the arrangement, in the second substrate of the vibration sensor, each of the small electrode groups of the predetermined number of phases may sequentially be arrayed in the relative movement direction, and an electrode gap between the small electrode groups adjacent to each other may be set to the phase difference generation gap. In the configuration, the phase difference generation gap is not provided on the electret group side, but the electrode gap between one of the small electrode groups and the small electrode group adjacent to the one of the small electrode groups is set to the phase difference generation gap. Therefore, the predetermined phase difference is included in the electric signals generated by the small electrode groups.

As to another example in which the phase difference generation gap is arranged on the electrode group side, in the second substrate of the vibration sensor, each of the small electrode groups of the predetermined number of phases may sequentially be arrayed in a direction different from the relative movement direction such that the small electrode groups do not overlap each other, and an electrode gap in the relative movement direction in the small electrode groups adjacent to each other in the direction in which the small electrode groups of the predetermined number of phases are arrayed may be set to the phase difference generation gap. When the electrode gap between the small electrode groups along the relative movement direction is set to the phase difference generation gap by arraying the small electrode groups of the predetermined number of phases in the direction different from the relative movement direction, similarly to the above example, the predetermined phase difference is included in the electric signals generated in the small electrode groups by the external vibration, and the influence of the ripple voltage can be relaxed by superimposing the generated electric signals. As long as the small electrode group can be arranged while the phase difference generation gap can be set, any direction (for example, a direction perpendicular to the relative movement direction) that does not overlap the relative movement direction may be used as the direction different from the relative movement direction.

The above configurations can be used as the arrangement of the phase difference generation gap on the electrode group side, and another configuration may be used. In consideration of practicality of the vibration sensor, various arrangement configurations of the phase difference generation gap can be used in the electrode group divided into the predetermined number of phases as long as the electric signals including the predetermined phase difference are generated in response to the external vibration.

An example in which the phase difference generation gap is arranged on the electret group side will be described below. For example, in the vibration sensor, the electret group may be divided into the predetermined number of phases to form small electret groups. In the first substrate of the vibration sensor, each of the small electret groups may sequentially be arrayed in the relative movement direction, and an electret gap between the small electret groups adjacent to each other may be set to the phase difference generation gap. As described above, the small electret group having the configuration is recognized as a set of electrets that can structurally be divided by the phase difference generation gap. In the vibration sensor having the configuration, the small electret groups are sequentially arrayed along the relative movement direction with the phase difference generation gap interposed therebetween in the electret group, whereby the predetermined phase difference is included in the electric signals generated by the small electrode groups that are arranged while opposed to the electret groups.

One or more embodiments of the present invention can be understood from another point of view different from that for the vibration sensor. In the above vibration sensor, the predetermined phase difference is included in the electric signals generated by the small electrode groups by arranging the phase difference generation gap in one of the electrode group and the electret group. Instead, the vibration sensor includes vibration detection units of the predetermined number of phases, each of the vibration detection units includes the electrode group and the electret group, and the relative positional relationship between the electrode group and the electret group is adjusted in each vibration detection unit such that the signals output from the vibration detection units include the predetermined phase difference. Therefore, the external vibration detection signal can be formed by superimposing the signals output from the vibration detection units, and the configuration contributes to the improvement of the convenience of the vibration sensor.

More particularly, a vibration sensor according to one or more embodiments of the present invention includes vibration detection units of a predetermined number of phases. Each of the vibration detection units includes: first and second substrates configured to be relatively movable by an external vibration while opposed to each other; an electret group including a plurality of electrets that are arrayed in a relative movement direction on a side of one of surfaces of the first substrate; and an electrode group including a plurality of electrodes that are arrayed in the relative movement direction on a side of a surface of the second substrate, the surface of the second substrate being opposed to the electret group. In the vibration sensor, a positional relationship between the electret group and the electrode group changes with a relative change in position of the first and second substrates by the external vibration to output an electric signal according to the external vibration. A predetermined positional shift along the relative movement direction is set in a relative positional relationship between the electret group and electrode group, the electret group and electrode group included in each vibration detection unit, between the vibration detection units such that a predetermined phase difference is generated between electric signals output from the vibration detection units of the predetermined number of phases when identical external vibration is provided to the vibration detection units of the predetermined number of phases. As a result of the provision of the external vibration to the vibration sensor, a signal formed by superimposing the electric signals output from the vibration detection units of the predetermined number of phases is output as an external vibration detection signal.

At this point, one or more embodiments of the present invention can be recognized as an external environment detection device including the above described vibration sensor. The external environment detection device is a device that detects a parameter concerning an external environment including at least the external vibration. Particularly, the external environment detection device is an external environment detection device including the above described vibration sensor. In the external environment detection device, the vibration sensor acts as a vibration power-generating device configured to generate electric power with the external vibration detection signal as power generation output, and the vibration sensor includes: a storage unit configured to store the electric power generated by the vibration sensor therein; and a processor configured to perform signal processing concerning the external vibration detection signal output by the vibration sensor. That is, in addition to the detection of the external vibration, the vibration sensor according to one or more embodiments of the present invention acts also as a power-generating device that generates the electric power that is stored in the storage unit and used in the signal processing by the processor. In the external environment detection device having the configuration, the electric power necessary for the signal processing on the detected external signal and for the detection of the external vibration can be supplied by itself. Therefore, the external environment detection device can be used in a wide variety of applications without external power supply.

The external environment detection device may further include an environmental parameter sensor configured to detect a predetermined environmental parameter except the external vibration. In the external environment detection device, using the electric power stored in the storage unit, the processor may perform the signal processing concerning driving of the environmental parameter sensor and/or the detection signal of the environmental parameter sensor. According to the configuration, the environmental parameter except the external vibration can be detected and/or the signal processing of the environmental parameter can be performed without external power supply.

As described above, the highly convenient vibration sensor that detects the external vibration using the electret can be provided.

DETAILED DESCRIPTION

Hereinafter, embodiments of the present invention will be described with reference to the drawings. The following embodiments are described only by way of example, but the present invention is not limited to configurations of the embodiments. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

First Embodiment

Figure 1:
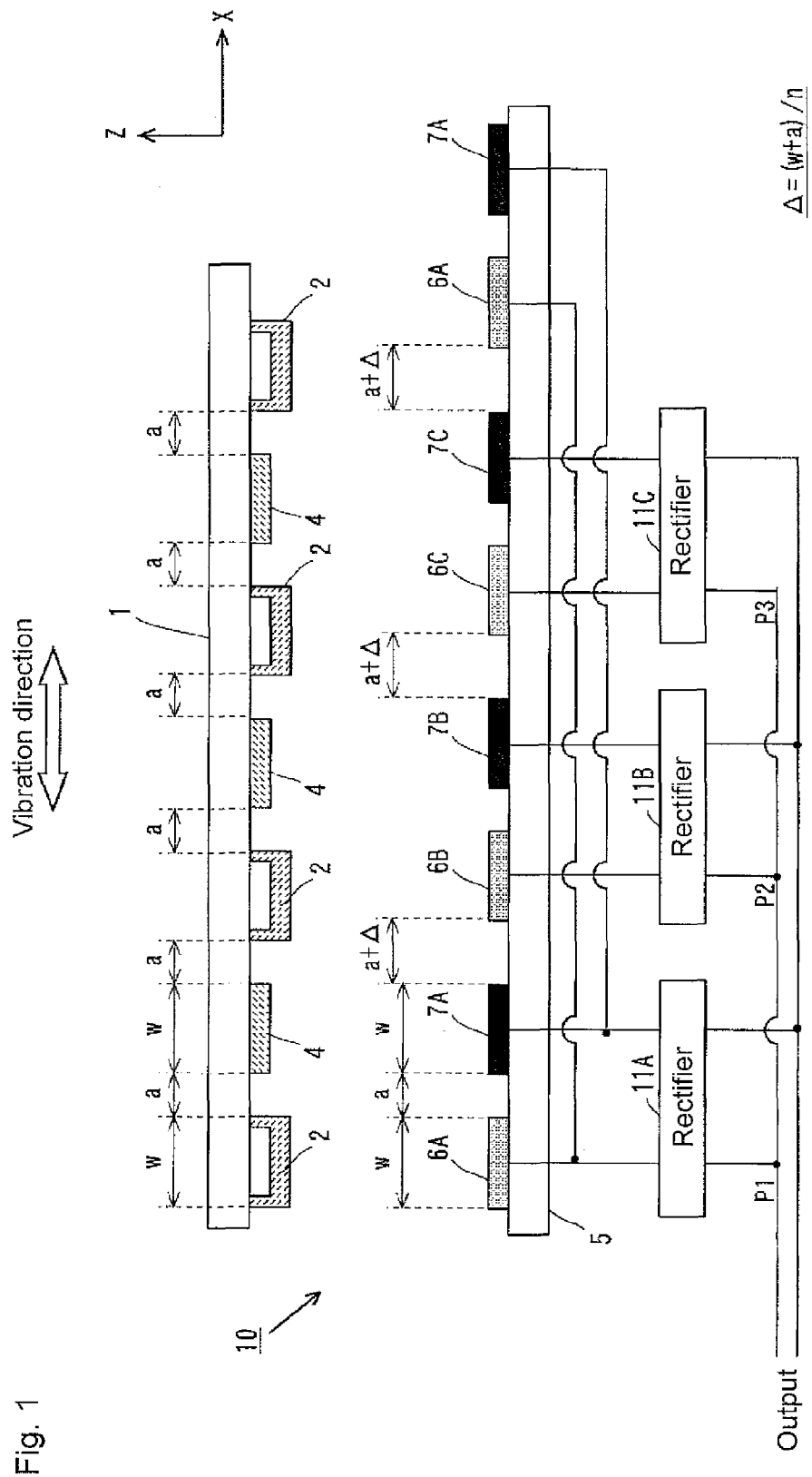
FIG. 1 is a view illustrating a schematic configuration of a vibration sensor according to a first embodiment of the present invention.

FIG. 1 illustrates a schematic configuration of vibration sensor 10 according to one or more embodiments of the present invention. FIG. 1 is a vertical sectional view of vibration sensor 10, namely, a sectional view when vibration sensor 10 is cut along a ZX-plane. Vibration sensor 10 includes first and second substrates 1 and 5 that are accommodated in a casing (not illustrated). First and second substrates 1 and 5 are configured to be relatively movable while opposed to each other. In the first embodiment, second substrate 5 is fixed to the casing. On the other hand, because both ends of first substrate 1 are connected to the casing by springs, first substrate 1 is configured to move (vibrate) with respect to the casing by an external vibration.

First and second substrates 1 and 5 are configured to be relatively movable while opposing to each other and keeping in parallel with each other, namely, while a gap between surfaces opposed to each other is kept constant. Therefore, as described later, an electric signal can be generated at a pair of electrodes 6 and 7 on a side of second substrate 5 by action of electret 2 on the side of first substrate 1. Because a principle generating the electric signal is well known, the detailed description is neglected. The configuration retaining the gap between first and second substrates 1 and 5, namely, the configuration for maintaining the smooth relative movement of first and second substrates 1 and 5 is important in order to enhance performance of generating the electric signal.

A structure on the side of first substrate 1 will be described below. In first substrate 1, on the side of the surface opposed to second substrate 5, a plurality of electrets 2 each formed on a conductor and a plurality of guard electrodes 4 that are not grounded are arranged so as to be alternately arrayed along a relative movement direction (a vibration direction in the drawings) of first and second substrates 1 and 5. The plurality of electrets 2 correspond to the electret group according to one or more embodiments of the present invention. The plurality of electrets 2 and the plurality of guard electrodes 4 are each formed into a comb shape, and electret 2 and guard electrode 4 are arranged into a nested shape. However, because FIG. 1 is the sectional view along the ZX-plane of vibration sensor 10 as described above, electrets 2 and guard electrodes 4 are illustrated so as to be alternately arranged. In the first embodiment, electret 2 is configured to semipermanently retain a negative charge. In the arrangement in which electrets 2 and guard electrodes 4 are alternately arrayed, w is a width (hereinafter simply referred to as "width of electret 2") of electret 2 in the relative movement direction and a width (hereinafter simply referred to as "width of electrode 4") of guard electrode 4 in the relative movement direction, and a is a gap (hereinafter simply referred to as "gap between electret 2 and guard electrode 4") between adjacent electret 2 and guard electrode 4 in the relative movement direction.

In the first embodiment, as described above, guard electrode 4 is configured not to be grounded. Alternatively, guard electrode 4 may be grounded. When guard electrode 4 is grounded, the electric signal is extracted as a stable signal around 0 V by first and second electrodes 6 and 7 described later according to the external vibration. Therefore, grounded guard electrode 4 is useful to stably detect the external vibration.

A structure on the side of second substrate 5 will be described below. In second substrate 5, on the side of the surface opposed to first substrate 1, a small electrode group is formed in each phase that is constructed with one or a plurality of sets of electrodes with a pair of electrodes (referred to as first electrode 6 and first electrode 7) as one set. In the first embodiment, the number of phases deciding the number of small electrode groups is set to 3, the three phases are referred to as a A-phase, a B-phase, and a C-phase, and the characters A, B, and C indicating the phases are affixed to the numerals (6 and 7) in the case that the phases to which first and second electrodes 6 and 7 belong are clearly expressed (the same holds true for rectifier 11 and the like). In FIG. 1, for the sake of convenience, the number of sets of first and second electrodes 6 and 7 included in one small electrode group is set to 1, and the small electrode groups are repeatedly arranged in the order of the A-phase, the B-phase, and the C-phase along the relative movement direction.

In the first embodiment, due to a relative position fluctuation of first substrate 1 including the plurality of electrets 2 with respect to second substrate 5, the electric signal is generated according to the relative position fluctuation (vibration) in each small electrode group, and individually rectified by a rectifier. Specifically, the electric signal generated by the small electrode group (first and second electrodes 6A and 7A) belonging to the A-phase is delivered to rectifier 11A. In parallel, the electric signal generated by the small electrode group (first and second electrodes 6B and 7B) belonging to the B-phase is delivered to rectifier 11B, and the electric signal generated by the small electrode group (first and second electrodes 6C and 7C) belonging to the C-phase is delivered to rectifier 11C. After passing through rectifiers 11A, 11B, and 11C, electric signals P1, P2, and P3 are superimposed on one another to become output P.

In the arrangement in which the small electrode groups are sequentially arrayed according to the phases in second substrate 5, w is the width (hereinafter simply referred to as "electrode width") of each of first and second electrodes 6 and 7 in the relative movement direction like the width of electret 2. Like the gap between electret 2 and guard electrode 4, a is the gap (hereinafter simply referred to as "electrode gap in small electrode group") between first and second electrodes 6 and 7 in the relative movement direction in one small electrode group corresponding to each phase. On the other hand, unlike the electrode gap a in the small electrode group, a+Δ is the electrode gap (for example, the electrode gap between second electrode 7A of the small electrode group corresponding to the A-phase and first electrode 6B of the small electrode group corresponding to the B-phase, hereinafter the electrode gap is referred to as "electrode gap between small electrode groups") between the small electrode group corresponding to one phase and the adjacent small electrode group in the relative movement direction. That is, the adjacent electrodes across the gap between the phases are set so as to have the electrode gap different from that in the phase.

In the electrode gap a+Δ between the small electrode groups, Δ is decided by the following equation.

$$\Delta = (w+a)/n$$

n: number of phases (in the first embodiment, n=3)

Figure 2A:
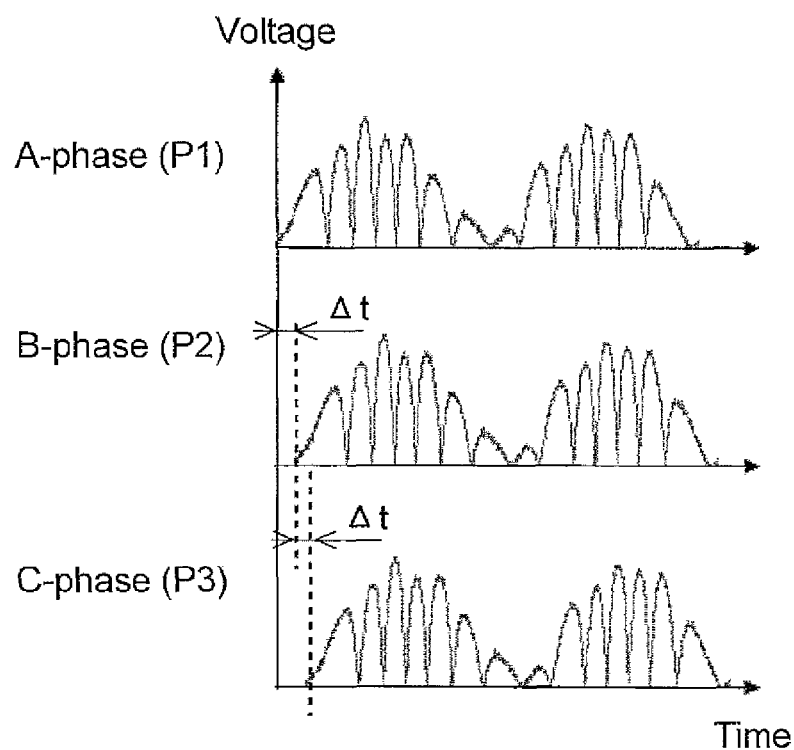
FIG. 2A is a diagram illustrating comparison among electric signals generated by small electrode groups of the vibration sensor in FIG. 1.

When first substrate 1 moves relative to second substrate 5 by the external vibration, a predetermined phase difference (time delay) can be included between the electric signals generated by the small electrode groups by setting the electrode gap between the small electrode groups. On the side of first substrate 1, the gap a between electret 2 and guard electrode 4 is kept constant irrespective of the phase to which the small electrode group belongs. On the other hand, on the side of second substrate 5, because the electrode gap in the small electrode group differs from the electrode gap between the small electrode groups, the phase difference corresponding to Δ that is of a difference between a+Δ and a is reflected in the electric signal generated by each small electrode group when electret 2 traverses the electrode gap a+Δ between the small electrode groups. FIG. 2A illustrates an example. An upper stage of FIG. 2A illustrates generation electric signal P1 between first and second electrodes 6A and 7A corresponding to the A-phase, a middle stage illustrates generation electric signal P2 between first and second electrodes 6B and 7B corresponding to the B-phase, and an upper stage illustrates generation electric signal P3 between first and second electrodes 6C and 7C corresponding to the C-phase. The phase difference between the generation electric signal of the A-phase and the generation electric signal of the B-phase can substantially be equalized to the phase difference between the generation electric signal of the B-phase and the generation electric signal of the C-phase, by deciding Δ as described above.

Figure 2B:
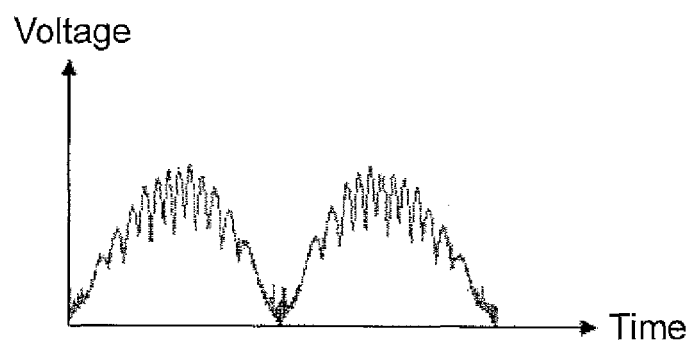
FIG. 2B is a diagram illustrating a signal in which the electric signals in FIG. 2A are superimposed on one another.

As illustrated in FIG. 1, in vibration sensor 10 according to one or more embodiments of the present invention, generation electric signals P1 to P3 are superimposed on one another to become output P as the external vibration detection signal. FIG. 2B illustrates the detection signal P generated by the superimposition. In each state in FIG. 2A, the ripple voltage has a relatively large influence. On the other hand, the generation electric signals in the small electrode groups that are adjusted so as to include the phase differences are superimposed on one another to lessen the influence of the ripple voltage, which allows the formation of the detection signal indicating the fundamental vibration extremely close to the external vibration. Thus, the external vibration can directly be detected without performing the signal processing concerning the ripple voltage by outputting the signal extremely close to the external vibration, so that the convenience of the vibration sensor that detects the external vibration can be enhanced.

The electrode gap a+Δ between the small electrode groups in FIG. 1 corresponds to the phase difference generation gap according to one or more embodiments of the present invention. Alternatively, the electrode gap a+Δ may be provided on not the side of second substrate 5 but the side of first substrate 1. In this case, while all the electrode gaps are equally set to a in second substrate 5, the gap that divides electrets 2 corresponding to the small electrode groups into the small groups is set as the phase difference generation gap according to the number of phases and the magnitude of the gap may be set to a+Δ in first substrate 1. The electrode gap between the small electrode groups, which is of the phase difference generation gap, is set to a+Δ in the first embodiment. Alternatively, the electrode gap between the small electrode groups may be set to a−Δ. Even if the electrode gap between the small electrode groups is set to a−Δ, the phase differences in the generation electric signals between the phases can substantially be equalized as illustrated in FIG. 2A.

Second Embodiment

Figure 3:
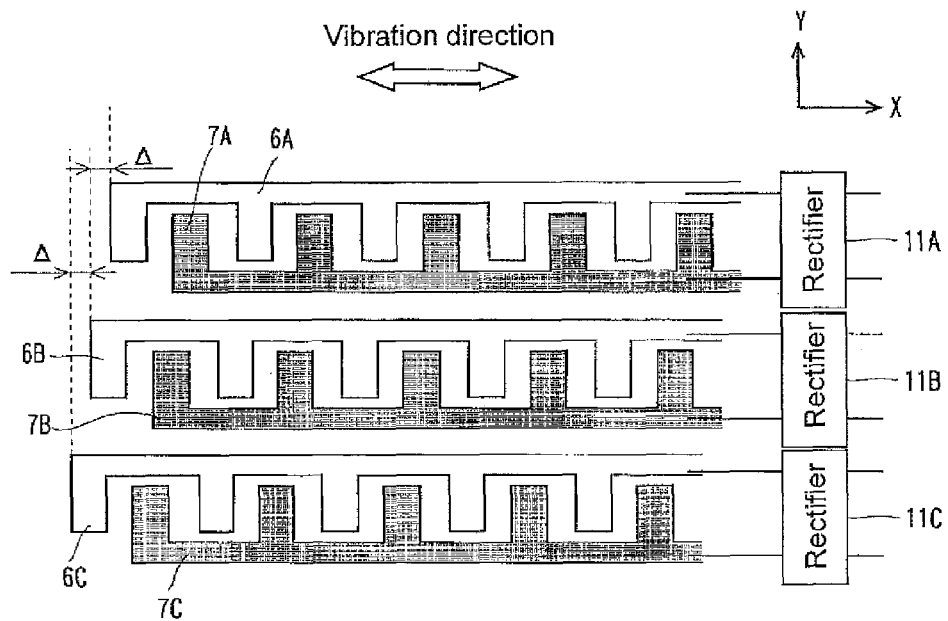
FIG. 3 is a diagram illustrating a schematic configuration of a vibration sensor according to a second embodiment of the present invention.

Vibration sensor 10 according to a second embodiment of the present invention will be described with reference to FIG. 3. FIG. 3 is a diagram illustrating the arrangement of the small electrode group (first electrode 6 and second electrode 7) on the side of second substrate 5 of vibration sensor 10 in an XY-plane (the configuration on the side of first substrate 1 is neglected in FIG. 3). Accordingly, the interdigital shapes of first and second electrodes 6 and 7 included in each small electrode group can be recognized in FIG. 3. In the first embodiment, as illustrated in FIG. 1, the small electrode groups are sequentially arranged in each phase along the relative movement direction of first and second substrates 1 and 5, and the electrode gap between the small electrode groups is set to the phase difference generation gap according to one or more embodiments of the present invention. In the configuration of the first embodiment, the small electrode groups are arranged along the relative movement direction. On the other hand, in the configuration of the second embodiment, the small electrode groups are arrayed in the direction different from the relative movement direction, specifically the direction (Y-direction) perpendicular to the relative movement direction.

Specifically, as illustrated in FIG. 3, first and second electrodes 6A and 7A corresponding to the A-phase are alternately arrayed in the X-direction, first and second electrodes 6B and 7B corresponding to the B-phase are alternately arrayed in the X-direction, and first and second electrodes 6C and 7C corresponding to the C-phase are alternately arrayed in the X-direction. The small electrode group constructed with first and second electrodes 6 and 7 of each phase are arrayed in the Y-direction. The small electrode groups are identical to one another in the dimensions, shape, and electrode gap (gap in relative movement direction) of the electrode. That is, in the second embodiment, the arrangement of the electrodes is two-dimensionally expanded on the side of second substrate 5. While the electrodes are two-dimensionally arranged in second substrate 5, the arrangement of electrets 2 in first substrate 1 is basically identical to the configuration in FIG. 1, and electrets 2 in first substrate 1 are arranged so as to cover the small electrode groups of the three phases on the side of second substrate 5.

A shift of Δ is set along the relative movement direction between the small electrode group corresponding to the A-phase and the small electrode group corresponding to the B-phase, and a shift of Δ is set along the relative movement direction between the small electrode group corresponding to the B-phase and the small electrode group corresponding to the C-phase. The definition of Δ is as already described in the first embodiment. In the configuration of the second embodiment, when first substrate 1 moves relative to second substrate 5 by the external vibration, the predetermined phase difference can be included in the electric signals generated by the small electrode groups corresponding to each phase due to the existence of the shift of Δ (see FIG. 2A). The external vibration detection signal in which the influence of the ripple voltage is lessened can be output by superimposing the electric signals generated by the small electrode groups on one another as illustrated in FIG. 2B. The configuration of vibration sensor 10 of the second embodiment includes the shift of Δ that corresponds to the phase difference generation gap according to one or more embodiments of the present invention, and the configuration of vibration sensor 10 of the second embodiment also contributes to the improvement of the convenience of the vibration sensor similarly to the first embodiment.

Third Embodiment

Figure 4A:
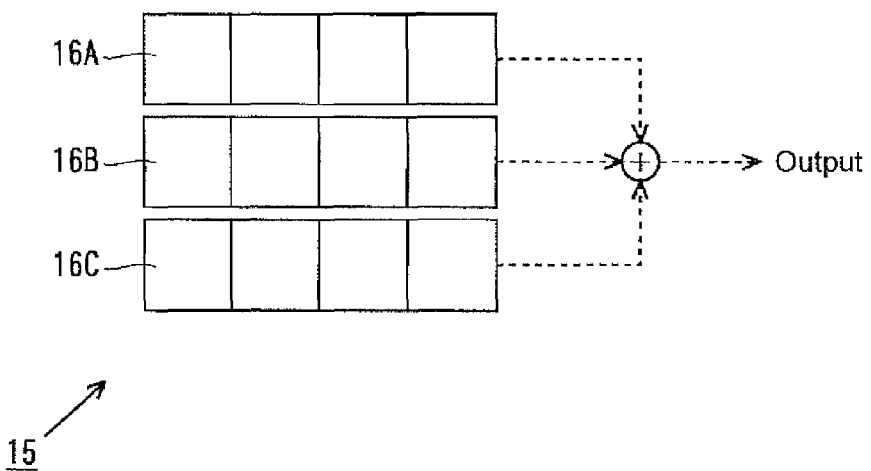
FIG. 4A is a first diagram illustrating a schematic configuration of a vibration sensor according to a third embodiment of the present invention.

Vibration sensor 10 according to a third embodiment of the present invention will be described with reference to FIGS. 4A and 4B. FIG. 4A is a diagram illustrating a schematic configuration of vibration sensor 15 according to one or more embodiments of the present invention. Vibration sensor 15 superimposes the generated signals from vibration detection units 16A, 16B, and 16C corresponding to the A-phase, the B-phase, and the C-phase on one another to output the external vibration detection signal. In the third embodiment, four vibration detection units 16 are arranged in each phase.

Figure 4B:
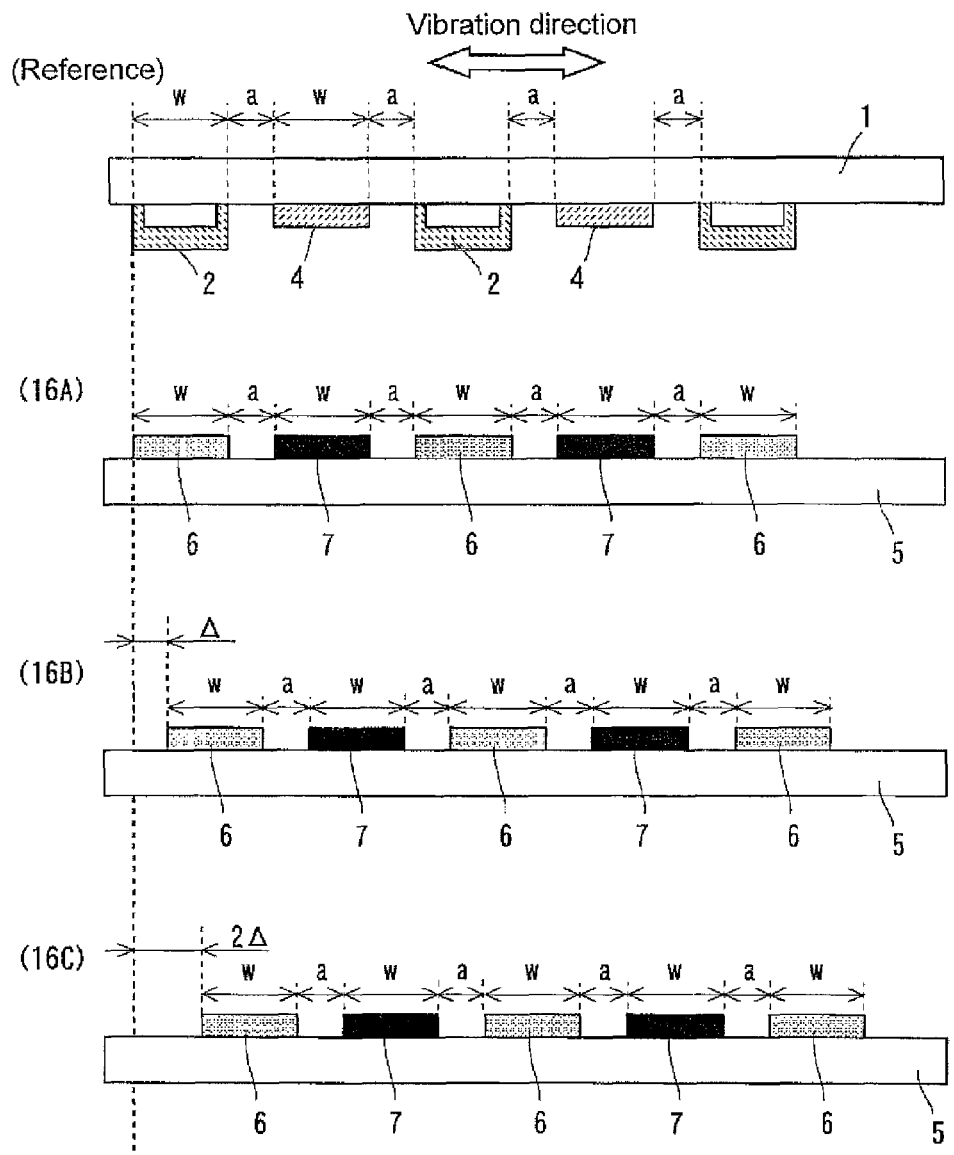
FIG. 4B is a second diagram illustrating the schematic configuration of the vibration sensor according to the third embodiment of the present invention.
Figure 7:
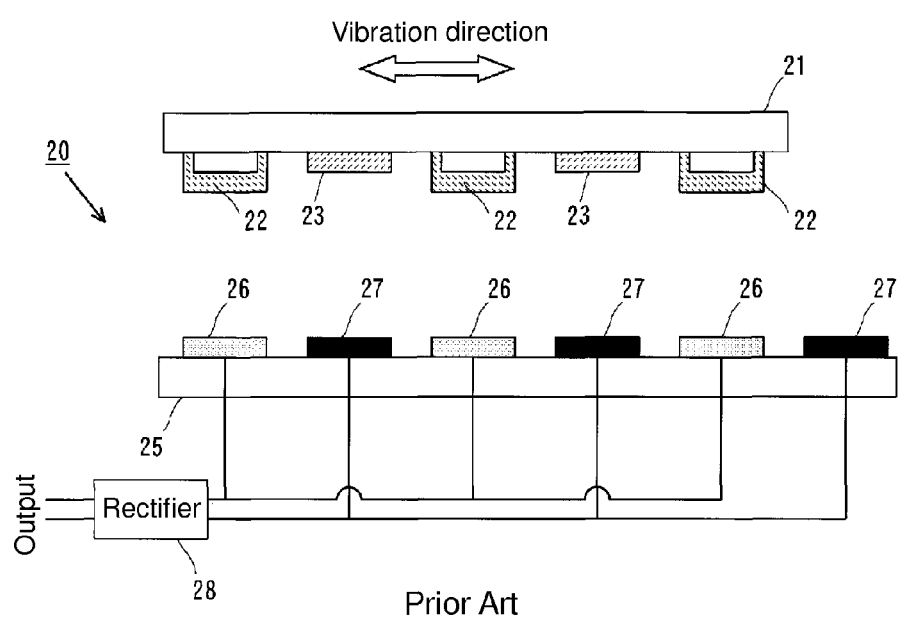
FIG. 7 is a diagram illustrating a schematic configuration of a conventional vibration sensor.
Figure 8A:
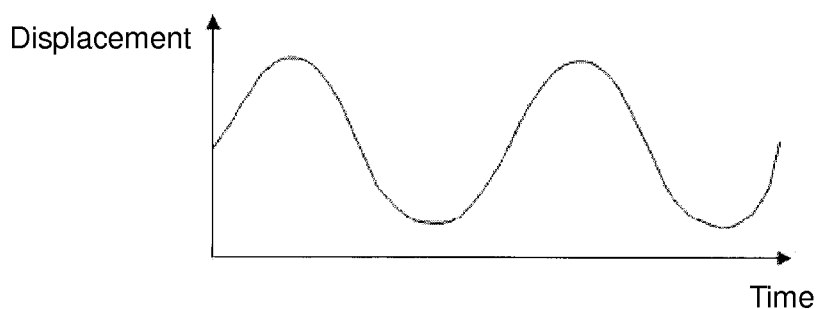
FIG. 8A is a first diagram illustrating an external vibration detection signal of the vibration sensor in FIG. 7.
Figure 8A:
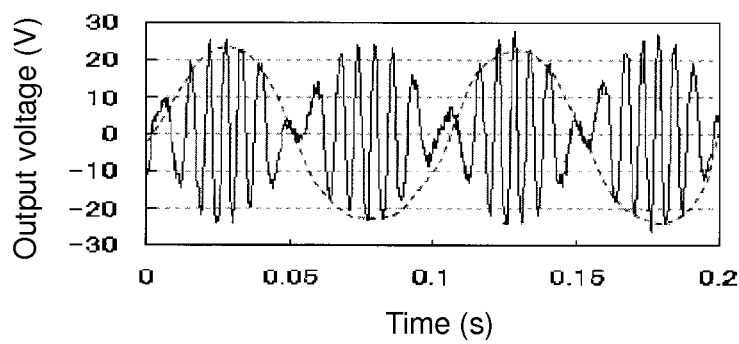
Figure 8B:
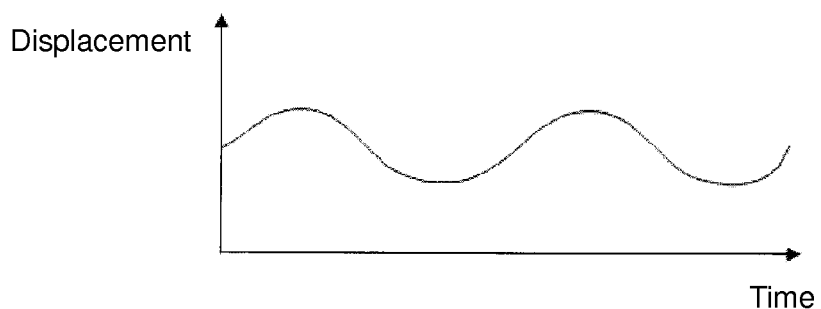
FIG. 8B is a second diagram illustrating the external vibration detection signal of the vibration sensor in FIG. 7.
Figure 8B:
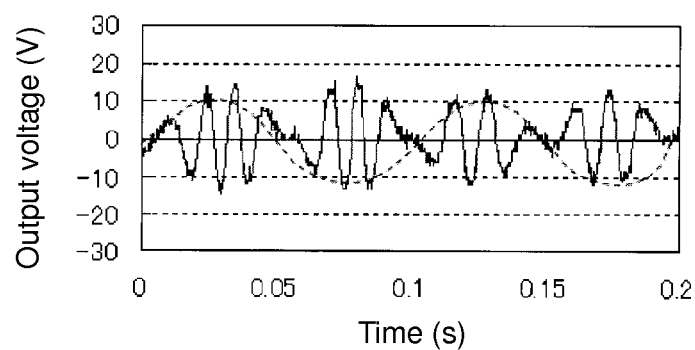

Vibration detection unit 16 of the third embodiment basically includes the arrangements of electrets 2 and first and second electrodes 6 and 7, which are identical to those of the conventional technology in FIG. 7 (see FIG. 4B, however, FIG. 4B is a diagram in which second substrates 5 are compared to one another in each phase based on first substrates 1 such that the difference in the vibration detection units can be understood in each phase). Accordingly, in single vibration detection unit 16, electret 2 has the width w, guard electrode 4 has the width w, and first and second electrodes 6 and 7 have the width w. Electret 2 and guard electrode 4 have the gap a, and first and second electrodes 6 and 7 have the electrode gap a.

On the other hand, in the third embodiment, a predetermined positional shift between the vibration detection units is set in the relative movement direction in the relative positional relationship between electret 2 and first and second electrodes 6 and 7 included in each vibration detection unit. That is, as illustrated in FIG. 4B, based on the relative positional relationship between electret 2 on first substrate 1 and first and second electrodes 6 and 7 on second substrate 5 in vibration detection unit 16A corresponding to the A-phase, the positions of first and second electrodes 6 and 7 on second substrate 5 are shifted by Δ in the relative movement direction with respect to electret 2 on first substrate 1, in vibration detection unit 16B corresponding to the B-phase. The positions of first and second electrodes 6 and 7 on second substrate 5 are shifted by 2Δ in the relative movement direction with respect to electret 2 on first substrate 1, in vibration detection unit 16C corresponding to the C-phase. The definition of Δ is as already described in the first embodiment.

The positions of first and second electrodes 6 and 7 on second substrate 5 are shifted in the relative movement direction with respect to electret 2 on first substrate 1 between the vibration detection units corresponding to the phases, which allows the phase difference in FIG. 2A to be included in the electric signal generated by the vibration detection unit corresponding to each phase in providing the external vibration. When the external vibration is provided, first substrate 1 of the vibration detection unit corresponding to each phase is evenly vibrated irrespective of the phase. At this point, because the positional shift is set in each phase, the resultant electric signal including the phase difference in FIG. 2A is generated by the vibration detection unit corresponding to each phase. As illustrated in FIG. 4A, the external vibration detection signal in which the influence of the ripple voltage is lessened can be output by superimposing the electric signals of the phases on one another. Thus, similarly to the first embodiment, the configuration of vibration sensor 15 of the third embodiment contributes to the improvement of the convenience of the vibration sensor.

Fourth Embodiment

The vibration sensors of the first to third embodiments of the present invention are configured to properly detect the external vibration. At the same time, the electric signal generated by the external vibration can be used as the power generation output in the vibration sensors, namely, the vibration sensors can be used as the power-generating device of the external vibration. Because the technology of generating the power by the external vibration using the electret has been developed, the detained description of the power generation is neglected.

Figure 5:
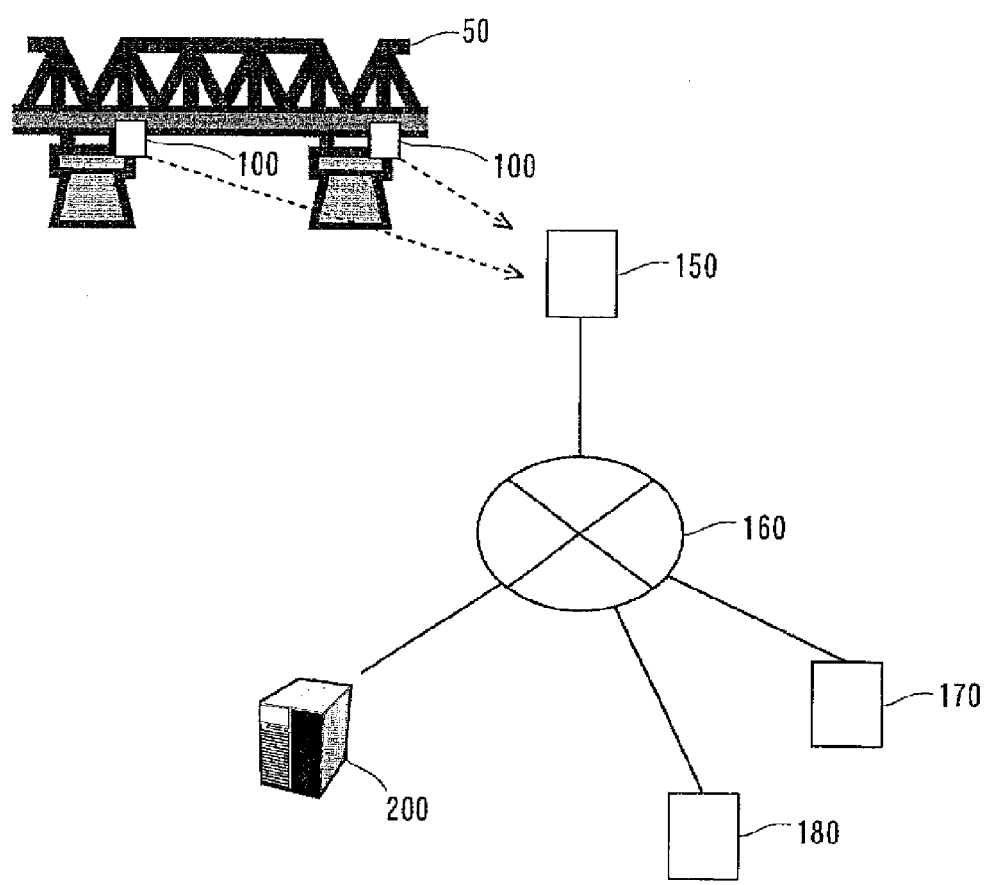
FIG. 5 is a diagram illustrating a schematic configuration of a system being able to collect information with an external environment detection device that includes the vibration sensor according to one or more embodiments of the present invention to detect an environmental parameter such as vibration.

FIG. 5 illustrates a schematic configuration of a management system of bridge 50 using external environment detection device 100 including the vibration sensor according to one or more embodiments of the present invention. Because performance such as strength degrades as time advances in the bridge, it is necessary to timely recognize a change in performance of bridge 50. For example, an amplitude (vibration displacement) of the vibration or a vibration frequency of bridge 50 changes with the advance of the degradation generated by an earthquake or repeated passage of heavy vehicles. For this reason, several external environment devices 100 including the vibration sensors are placed on bridge 50. External environment detection device 100 detects information on the vibration of bridge 50 using vibration sensors 10 and 15, and includes an acceleration sensor that detects acceleration of bridge 50 as another environmental parameter. The environmental parameters detected by vibration sensor 10 and the like are wirelessly transmitted to base station 150. Base station 150 is connected to Internet 160, and the received information on the environmental parameters is delivered to server 200 through Internet 160.

Server 200 performs processing concerning the performance of bridge 50 using the acquired environmental parameter, and determines what kind of state bridge 50 is in (for example, a degree of degradation of the strength). Server 200 can also acquire other pieces of information (such as meteorological information on an area where bridge 50 exists and traffic load data of bridge 50) necessary for the determination from data servers 170 and 180 connected to Internet 160.

Figure 6:
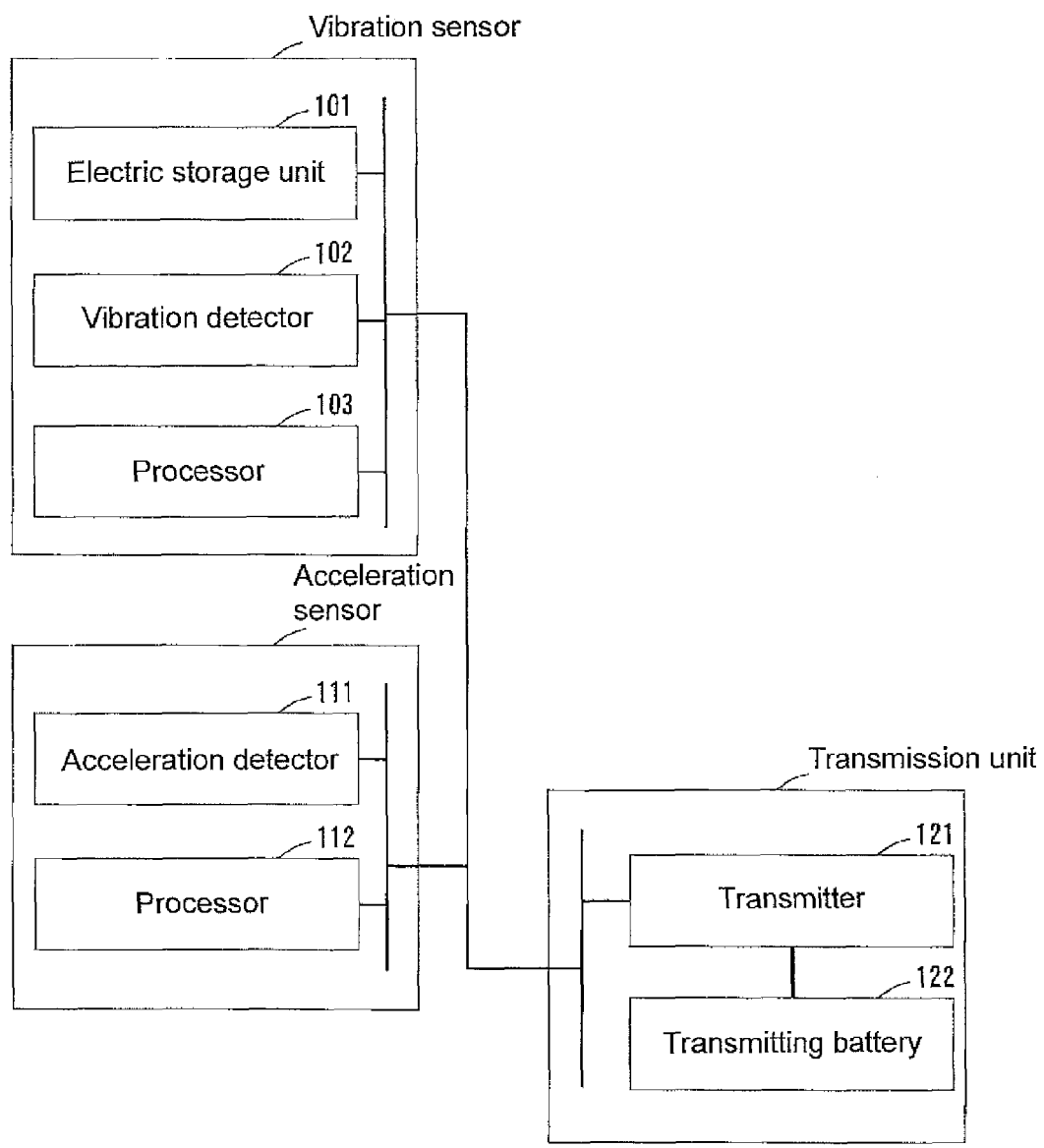
FIG. 6 is a functional block diagram illustrating as an image functions exerted by the external environment detection device in FIG. 5.

FIG. 6 illustrates a functional block diagram as an image of functions exerted by external environment detection device 100. External environment detection device 100 may include a functional section except the functional sections in FIG. 6. External environment detection device 100 roughly includes the vibration sensor, the acceleration sensor, and a transmission unit. Electric storage unit 101, vibration detector 102, processor 103 are formed in the vibration sensor. When the vibration sensor acts as the power-generating device, electric storage unit 101 stores the generation power therein. As described above, vibration detector 102 is the functional section that detects the external vibration when vibration sensors 10 and 15 act as the device that detects the external vibration. Processor 103 is the functional section that processes the information on the external vibration detected by vibration detector 102 as needed basis. Processor 103 is driven by the electric power stored in storage unit 101.

Acceleration detector 111 and processor 112 are formed in the acceleration sensor. Acceleration detector 111 is the functional section that detects the acceleration information on bridge 50. Because an acceleration detection method is well known, the description is neglected. Processor 112 is the functional section that processes the information on the acceleration detected by acceleration detector 111 as needed basis. Acceleration detector 111 and processor 112 can be driven by the electric power stored in storage unit 101.

Transmitter 121 and transmitting battery 122 are formed in the transmission unit. Transmitter 121 is the functional section that temporarily stores the detection data of vibration detector 102 or acceleration detector 111 and a processing result of processor 103 or processor 112 therein, and transmits the detection data and the processing result to base station 150. Because the appropriate power is required to wirelessly transmit the data to base station 150, the transmission power is supplied to transmitter 121 from not the electric power stored in storage unit 101 but transmitting battery 122.

As described above, in external environment detection device 100, the vibration detection and the acceleration detection of bridge 50 and the corresponding data processing are covered with the power generated by the vibration sensor according to one or more embodiments of the present invention. Therefore, it can be said that the detection of the environmental parameter is substantially performed without power supply. As a result, the vibration of bridge 50 can easily be detected, and a frequency of exchanging the battery to detect the environmental parameter can be reduced.

In the fourth embodiment, the transmission power of transmitter 121 is supplied from transmitting battery 122. Alternatively, the data may wirelessly be transmitted to base station 150 using the transmission power that is obtained when the vibration sensor acts as the power-generating device, namely, the electric power stored in storage unit 101. In this case, when the electric power is sufficiently stored in storage unit 101, transmitting battery 122 can be eliminated, or storage unit 101 may be used as an auxiliary power supply while transmitting battery 122 is placed.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

DESCRIPTION OF SYMBOLS 1 first substrate
2 electret
4 guard electrode
5 second substrate
6 first electrode
7 second electrode
10 vibration sensor
11 rectifier
15 vibration sensor
16 vibration detection unit

The invention claimed is:

1. A vibration sensor comprising:
a first substrate;
a second substrate relatively movable by an external vibration while opposed to the first substrate;
an electret group comprising a plurality of electrets that are arrayed in a relative movement direction on a side of one of surfaces of the first substrate; and
an electrode group comprising a plurality of electrodes that are arrayed in the relative movement direction on a side of a surface of the second substrate,
wherein the surface of the second substrate is opposed to the electret group,
wherein a positional relationship between the electret group and the electrode group changes with a relative change in position of the first and second substrates by the external vibration to output an external vibration detection signal,
wherein the electrode group is divided into a predetermined number of phases of at least two, a small electrode group that generates an electric signal according to the external vibration in each phase,
wherein, in one of the electrode group and the electret group, a phase difference generation gap that generates a predetermined phase difference between electric signals generated by the plurality of small electrode groups is provided according to the predetermined number of phases, the phase difference generation gap provided between the electrodes adjacent to each other comprised in the electrode group or between electrets adjacent to each other comprised in the electret group, and
wherein, as a result of the relative change in position of the first and second substrates by the external vibration, a signal formed by superimposing the electric signals generated by the plurality of small electrode groups on each other is output as the external vibration detection signal.

2. The vibration sensor according to claim 1,
wherein one of the electret group and the electrode group is set to a uniform arrangement group in which gaps between the electrodes comprised in the electrode group or gaps between the electrets comprised in the electret group are kept constant, wherein another one of the electret group and the electrode group is set to a non-uniform arrangement group in which the electrets arranged in the electret group or the electrodes arranged in the electrode group comprise the phase difference generation gap, and wherein the gaps between the electrodes adjacent to each other or the gaps between the electrets adjacent to each other in the uniform arrangement group are set substantially equal to the gaps between the electrodes or the gaps between the electrets adjacent to each other except the phase difference generation gap in the non-uniform arrangement group.

3. The vibration sensor according to claim 2, wherein a phase difference generation gap A1 is expressed by the following equation:

$$A1 = A \pm (W+A)/N,$$

where W is a width of the electrode or the electret, A is the gap between the electrodes or the gap between the electrets adjacent to each other except the phase difference generation gap in the non-uniform arrangement group, and N is the predetermined number of phases.

4. The vibration sensor according to claim 1, wherein, in the second substrate, each of the small electrode groups of the predetermined number of phases is sequentially arrayed in the relative movement direction, and an electrode gap between the small electrode groups adjacent to each other is set to the phase difference generation gap.

5. The vibration sensor according to claim 1, wherein, in the second substrate, each of the small electrode groups of the predetermined number of phases is sequentially arrayed in a direction different from the relative movement direction such that the small electrode groups do not overlap each other, and wherein an electrode gap in the relative movement direction in the small electrode groups adjacent to each other in the direction in which the small electrode groups of the predetermined number of phases are arrayed is set to the phase difference generation gap.

6. The vibration sensor according to claim 1, wherein the electret group is divided into the predetermined number of phases to form small electret groups, and wherein, in the first substrate, each of the small electret groups is sequentially arrayed in the relative movement direction, and an electret gap between the small electret groups adjacent to each other is set to the phase difference generation gap.

7. A vibration sensor comprising:

vibration detection units of a predetermined number of phases, wherein each of the vibration detection units comprises:
a first substrate;
a second substrate relatively movable by an external vibration while opposed to the first substrate;
an electret group comprising a plurality of electrets that are arrayed in a relative movement direction on a side of one of surfaces of the first substrate; and
an electrode group comprising a plurality of electrodes that are arrayed in the relative movement direction on a side of a surface of the second substrate, wherein the surface of the second substrate is opposed to the electret group, wherein a positional relationship between the electret group and the electrode group changes with a relative change in position of the first and second substrates by the external vibration to output an electric signal according to the external vibration, wherein a predetermined positional shift along the relative movement direction is set in a relative positional relationship between the electret group and electrode group, the electret group and electrode group comprised in each vibration detection unit, between the vibration detection units such that a predetermined phase difference is generated between electric signals output from the vibration detection units of the predetermined number of phases when identical external vibration is provided to the vibration detection units of the predetermined number of phases, and wherein, as a result of the provision of the external vibration to the vibration sensor, a signal formed by superimposing the electric signals output from the vibration detection units of the predetermined number of phases is output as an external vibration detection signal.

8. An external environment detection device comprising the vibration sensor according to claim 1, wherein the vibration sensor acts as a vibration power-generating device that generates electric power with the external vibration detection signal as power generation output, and wherein the vibration sensor comprises:
a storage unit that stores the electric power generated by the vibration sensor therein; and
a processor that performs signal processing concerning the external vibration detection signal output by the vibration sensor.

9. The external environment detection device according to claim 8, further comprising:

an environmental parameter sensor that detects a predetermined environmental parameter except the external vibration, wherein, using the electric power stored in the storage unit, the processor performs the signal processing concerning driving of the environmental parameter sensor or the detection signal of the environmental parameter sensor.

* * * * *